(12) United States Patent
Kubota et al.

(10) Patent No.: US 10,860,064 B2
(45) Date of Patent: Dec. 8, 2020

(54) ELECTRONIC DEVICE HAVING A POINTING STICK

(71) Applicant: LENOVO (SINGAPORE) PTE. LTD., Singapore (SG)

(72) Inventors: Kazuyuki Kubota, Kanagawa (JP); Fumitake Mizoguchi, Kanagawa (JP); Yoshiyuki Shibayama, Kanagawa (JP); Tabito Miyamoto, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 16/508,489

(22) Filed: Jul. 11, 2019

(65) Prior Publication Data
US 2020/0019216 A1    Jan. 16, 2020

(30) Foreign Application Priority Data

Jul. 11, 2018 (JP) .................................. 2018-131194

(51) Int. Cl.
*G06F 1/16* (2006.01)
*G06F 3/02* (2006.01)
*G06F 3/0338* (2013.01)

(52) U.S. Cl.
CPC .......... *G06F 1/1658* (2013.01); *G06F 3/0213* (2013.01); *G06F 3/0338* (2013.01)

(58) Field of Classification Search
CPC ..... G06F 1/1658; G06F 3/0213; G06F 3/0338
See application file for complete search history.

(56) References Cited

U.S. PATENT DOCUMENTS 5,708,562 A * 1/1998 Agata .................... G05G 9/047
345/161

FOREIGN PATENT DOCUMENTS

| JP | 0916324 | 1/1997 |
|---|---|---|
| JP | 09204267 | 8/1997 |
| JP | 2002007058 A | 1/2002 |
| JP | 2004227420 A | 8/2004 |
| JP | 2015-069296 A | 4/2015 |
| JP | 2018-013947 A | 1/2018 |
| JP | 2018-013974 A | 1/2018 |

* cited by examiner

*Primary Examiner* — Wing H Chow
(74) *Attorney, Agent, or Firm* — Antony P. Ng; Russell Ng PLLC (57) ABSTRACT

An electronic device having a pointing stick is disclosed. The electronic device includes a base member for supporting a pointing stick. The base member has a first pressed part provided on one side of the pointing stick with respect to a sliding direction of a slide member and a second pressed part provided on the other side of the pointing stick. The slide member has a first pressing part capable of pressing the first pressed part of the base member and a second pressing part capable of pressing the second pressed part.

11 Claims, 11 Drawing Sheets

ELECTRONIC DEVICE HAVING A POINTING STICK

PRIORITY CLAIM

The present application claims benefit of priority under 35 U.S.C. §§ 120, 365 to the previously filed Japanese Patent Application No. JP2018-131194 with a priority date of Jul. 11, 2018, which is incorporated by reference herein.

TECHNICAL FIELD

The present invention relates to electronic devices in general, and in particular to an electronic device having a pointing stick.

BACKGROUND

Electronic devices such as laptop personal computers (laptop PCs) include ones having a display chassis configured to be rotationally movable from a 0-degree position to an approximately 180-degree position with respect to a main body chassis and ones having a display chassis configured to be rotationally movable to a 360-degree position beyond a 180-degree position. Some of these types of electronic devices are provided with an operating member such as a pointing stick along with a keyboard on a surface of their main body chassis.

In a prior art configuration, a pointing stick can be lowered from the surface of the main body chassis when the display chassis is closed. This configuration prevents a pointing stick from interfering with a closed display when the display chassis is, for example, in the 0-degree position, and as a result, it is possible to make a chassis thinner. Furthermore, this configuration prevents a pointing stick from interfering with a top surface of a desk or the like when the display chassis is, for example, in the 360-degree position, and as a result, it is possible to prevent the pointing stick from damage and/or breakage.

The above-described prior art configuration is provided with a pair of right and left slide members for raising and lowering the pointing stick, which increases the component cost and the weight. Furthermore, in the above-described prior art configuration, respective thicknesses of the two slide members occupy a lot of space on a circuit board provided below them. Therefore, the packaging design of electronic components on the circuit board is largely restricted.

Meanwhile, in a second prior art configuration, a pair of pressing parts of one slide member is forked at its distal end are pressed against a pair of pressed parts of a base member that supports the pointing stick. However, in the second prior art configuration, the slide member slides in a right-left direction, while the base member has the pair of pressed parts and the pointing stick that are arranged in a line in a front-rear direction. Furthermore, guide members that guide the base member to make a raising and lowering movement are arranged before and behind the base member across the pointing stick. That is, a longitudinal direction of the base member that supports the pointing stick is perpendicular to a sliding direction of the slide member. Therefore, the space on the circuit board is occupied by not only the extent of the one slide member and the base member in the right-left direction but also the extent of the base member overhanging in the front-rear direction. As a result, the effect of reducing the restriction on the packaging design of electronic components on the circuit board that are provided below the pointing stick is limited, and the effect of making the chassis thinner is also limited.

Consequently, it would be desirable to provide an electronic apparatus capable of securing a lot of space in a top-bottom direction inside a chassis even if the electronic apparatus includes a mechanism of raising and lowering an operating member.

SUMMARY

In accordance with an embodiment of the present disclosure, an electronic device includes a chassis; an operating member exposed to a surface of the chassis; a base member capable to be raised and lowered inside the chassis and moves between a raised position of raising the operating member supported on one surface thereof from the surface of the chassis and a lowered position of lowering the operating member from the surface of the chassis; an elastic member that biases the base member in a direction from the raised position towards the lowered position; and a slide member configured to be slidable inside the chassis and, when having slid in one direction, presses the base member against a biasing force of the elastic member to set the base member in the raised position, while, when having slid in another direction opposite to the one direction, which releases the operating member from a pressing force, and thereby sets the base member in the lowered position using the biasing force of the elastic member. The base member has a first pressed part provided on one side of the operating member with respect to a sliding direction of the slide member and a second pressed part provided on another side of the operating member that is opposite to the one side, and the slide member has a first pressing part capable of pressing the first pressed part of the base member and a second pressing part capable of pressing the second pressed part.

With the above-mentioned configuration, the operating member is raised and lowered by one slide member; therefore, it is possible to secure a lot of space in a top-bottom direction inside the chassis. Furthermore, the first and second pressed parts of the base member that are pressed by the first and second pressing parts of the slide member are provided on the one side and other side of the operating member with respect to the sliding direction of the slide member. Thus, the base member that raises and lowers the operating member can adopt a configurational posture with its longer side along the sliding direction of the slide member. As a result, the extent of the space in the top-bottom direction inside the chassis that is occupied by the base member substantially overlaps with the extent occupied by the slide member. Accordingly, the raising and lowering movement of the base member can be secured with the amount of reduction rarely different from the amount of reduction in the space due to the slide member. That is, it is possible to secure a lot of space in the top-bottom direction inside the chassis, and is possible to considerably diminish the restriction on the packaging design of, for example, electronic components on a circuit board provided below them.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
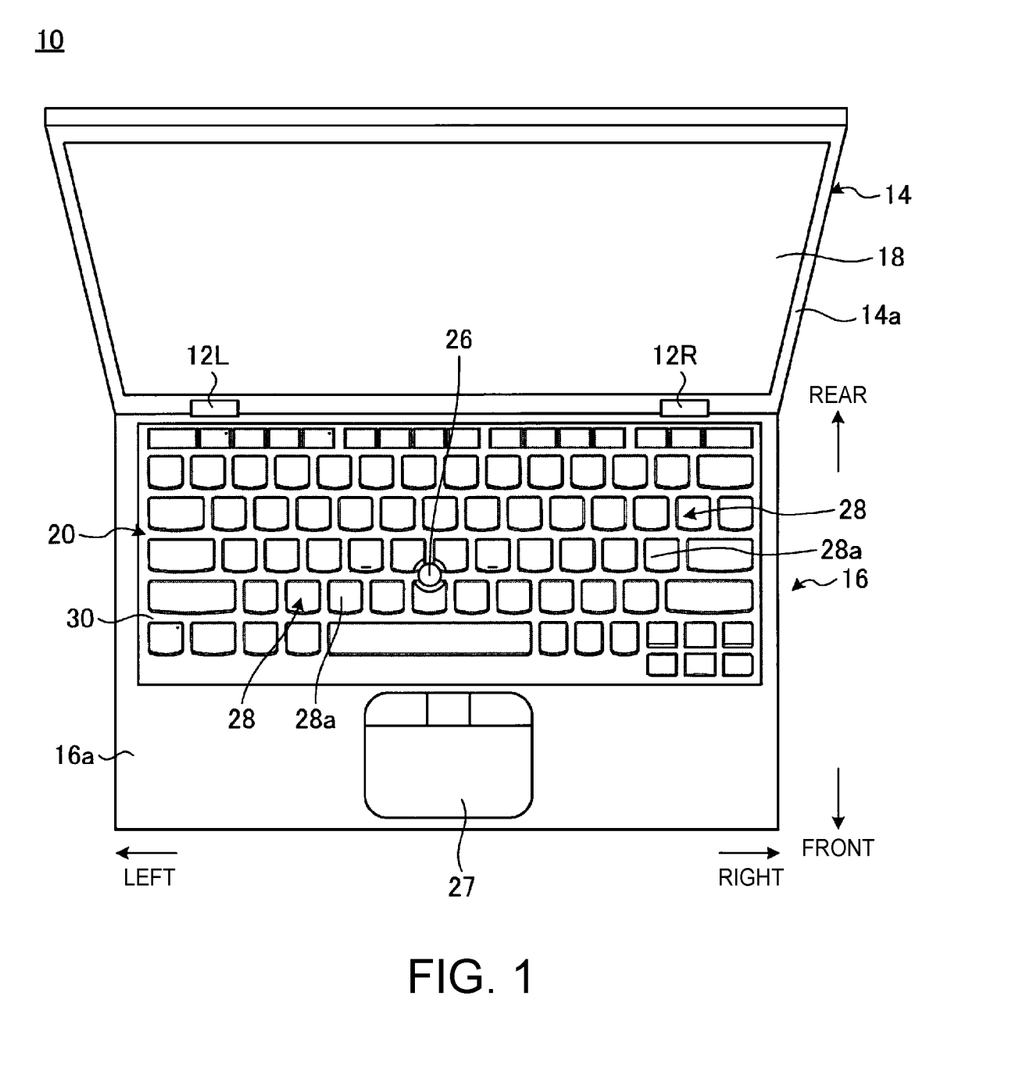
FIG. 1 is a plan view of an electronic apparatus, according to one embodiment.
Figure 2A:
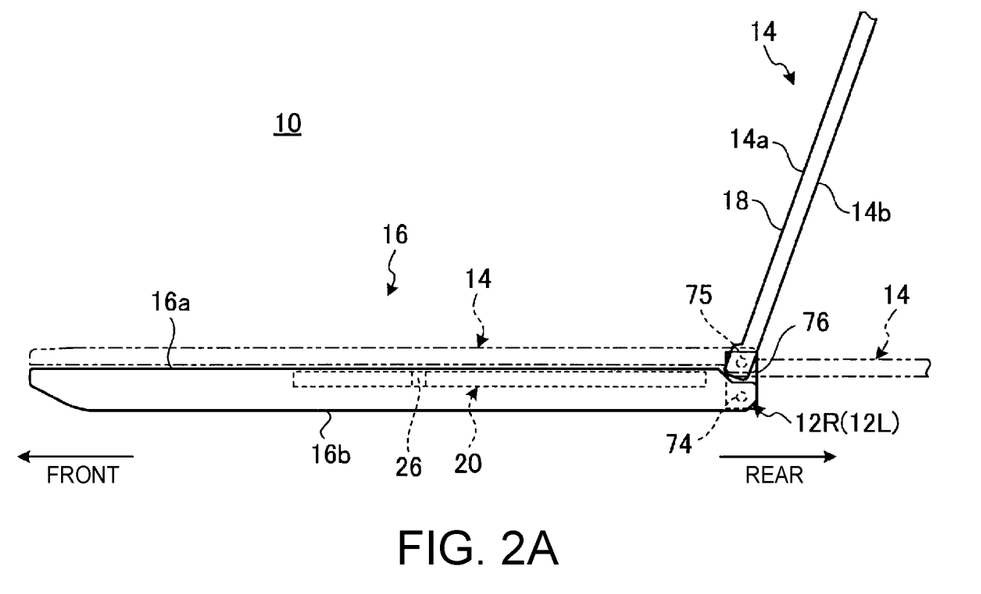
FIG. 2A is a side view of the electronic apparatus shown in FIG. 1.
Figure 2B:
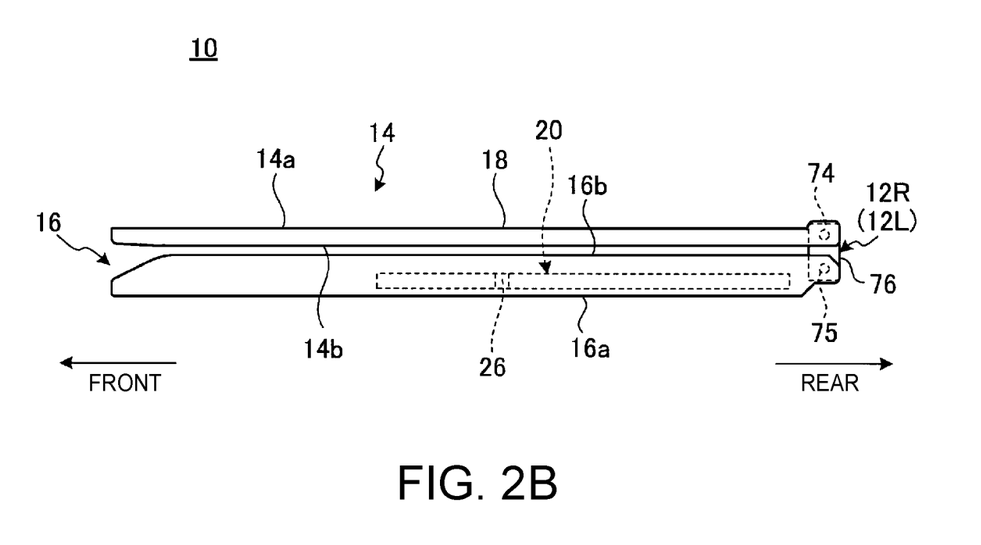
FIG. 2B is a side view of the electronic apparatus when used as a tablet PC with a display chassis rotationally moved in an open direction from a state shown in FIG. 2A to a 360-degree position.

FIG. 1 is a plan view of an electronic apparatus 10 according to one embodiment. FIG. 1 shows a top view of the electronic apparatus 10 when it is in laptop mode in which a display chassis 14 is open with respect to a main body chassis 16 through hinge mechanisms 12L and 12R. FIG. 2A is a side view of the electronic apparatus 10 shown in FIG. 1. FIG. 2B is a side view of the electronic apparatus 10 when used as a tablet PC with the display chassis 14 rotationally moved in an open direction from a state shown in FIG. 2A to a 360-degree position.

The electronic apparatus 10 according to the present embodiment is a convertible PC that can be used as a laptop PC and a tablet PC. In a state where the display chassis 14 is rotationally moved to an angular position of 90 degrees to approximately 180 degrees with respect to the main body chassis 16, the electronic apparatus 10 goes into the laptop mode in which it can be suitably used as a laptop PC (see FIGS. 1 and 2A). In a state where the display chassis 14 is rotationally moved to the 360-degree position with respect to the main body chassis 16, the electronic apparatus 10 goes into tablet mode in which it can be suitably used as a tablet PC (see FIG. 2B). The electronic apparatus 10 may be a general laptop PC that the display chassis 14 is rotationally movable in an angular range of 0 degrees to approximately 180 degrees with respect to the main body chassis 16. The electronic apparatus 10 may be, for example, a cell-phone, a smartphone, or an electronic organizer, besides a convertible PC or a laptop PC.

Hereinafter, when viewed from the side of a user who operates a keyboard device 20 while viewing a display 18 in the laptop mode shown in FIGS. 1 and 2A, the near and far sides are referred to as the "front" and the "rear," respectively; a thickness direction of the main body chassis 16 is referred to as a "top-bottom direction;" and a width direction of the main body chassis 16 is referred to as a "right-and-left direction."

As for the angular position of the display chassis 14 with respect to the main body chassis 16, in a state where the display chassis 14 is completely closed with respect to the main body chassis 16, a posture of the display chassis 14 when its front surface 14a faces a top surface 16a of the main body chassis 16, i.e., a posture of the display chassis 14 when the display 18 faces the keyboard device 20 is referred to as a 0-degree position (see the display chassis 14 indicated by an alternate long and two short dashes line on the main body chassis 16 in FIG. 2A). Then, the angular position of the display chassis 14 is described with an angle from this 0-degree position to a position of the display chassis 14 rotationally moved in an open direction. For example, a posture of the display chassis 14 when the front surface 14a is perpendicular to the top surface 16a of the main body chassis 16 is referred to as a 90-degree position. A posture of the display chassis 14 when the front surface 14a and the top surface 16a face the same direction (upward) and are parallel to each other is referred to as a 180-degree position (see the display chassis 14 indicated by an alternate long and two short dashes line on the right of the main body chassis 16 in FIG. 2A). A posture of the display chassis 14 when its rear surface 14b faces a bottom surface 16b of the main body chassis 16 is referred to as a 360-degree position (see FIG. 2B). Depending on the structure of the main body chassis 16, the display chassis 14, or the hinge mechanisms 12L and 12R, the angular position of the display chassis 14, such as the 0-degree position, the 180-degree position, or the 360-degree position, may naturally deviate slightly from the exact angular position indicated by a numerical value of an angle.

As shown in FIGS. 1, 2A, and 2B, the electronic apparatus 10 has a configuration in which the display chassis 14 and the main body chassis 16 are connected by the pair of left and right hinge mechanisms 12L and 12R (hereinafter, sometimes referred to collectively as "the hinge mechanism 12") so that the display chassis 14 can be rotationally moved from the 0-degree position to the 360-degree position.

The display chassis 14 is electrically connected to the main body chassis 16 by a cable (not shown) running through the hinge mechanism 12. The display 18 includes, for example, a touch panel type liquid crystal display.

The main body chassis 16 is formed into a flattened box, and is provided with the hinge mechanism 12 on its rear end. Inside the main body chassis 16, a battery device, a circuit board 22, various electronic components 24L and 24H such as an arithmetic unit and a memory mounted on the circuit board 22, etc. are stored (see FIG. 4A). The keyboard device 20 is provided on the top surface 16a of the main body chassis 16. A pointing stick (an operating member) 26 is provided substantially in the center of the keyboard device 20. The pointing stick 26 is an operating member for operating a cursor (a mouse pointer) displayed on the display 18, and can operate the cursor instead of a mouse. A touchpad 27 is provided on the front of the keyboard device 20. The touchpad 27 is for operating the cursor (the mouse pointer) displayed on the display 18. On the rear of the touchpad 27, three function buttons that function in connection with a cursor operation through the pointing stick 26 or the touchpad 27 are provided.

The keyboard device 20 includes multiple key switches 28 arranged in the front-rear and right-left directions. A gap between keytops 28a that are respective operating surfaces of the key switches 28 is filled with a frame 30. The keyboard device 20 has an isolation structure in which the frame 30 separates between the adjacent keytops 28a, and the keytops 28a are independent of one another. The frame 30 is a net-like plate provided with multiple holes in which the keytops 28a are installed. The frame 30 is provided in a position substantially on the same level as or slightly lower than the top surface 16a of the main body chassis 16.

The main body chassis 16 is provided with a key position setting mechanism of moving the keytops 28a to a storage position pushed downward from a use position used in a normal operation and holding them in the storage position when the display chassis 14 is at least either in the 0-degree position or the 360-degree position. The key position setting mechanism is a mechanism that holds the keytops 28a in the use position when the display chassis 14 is, for example, in a range from the 70-degree position to the 180-degree position, and holds the keytops 28a in the storage position when the display chassis 14 is in the 0-degree position or the 360-degree position. The up-and-down movement of the keytops 28a caused by the key position setting mechanism interlocks with a rotational movement of the display chassis 14. As the key position setting mechanism, for example, a publicly-known configuration disclosed in above-described Japanese Patent No. 6219457 may be adopted.

Figure 4A:
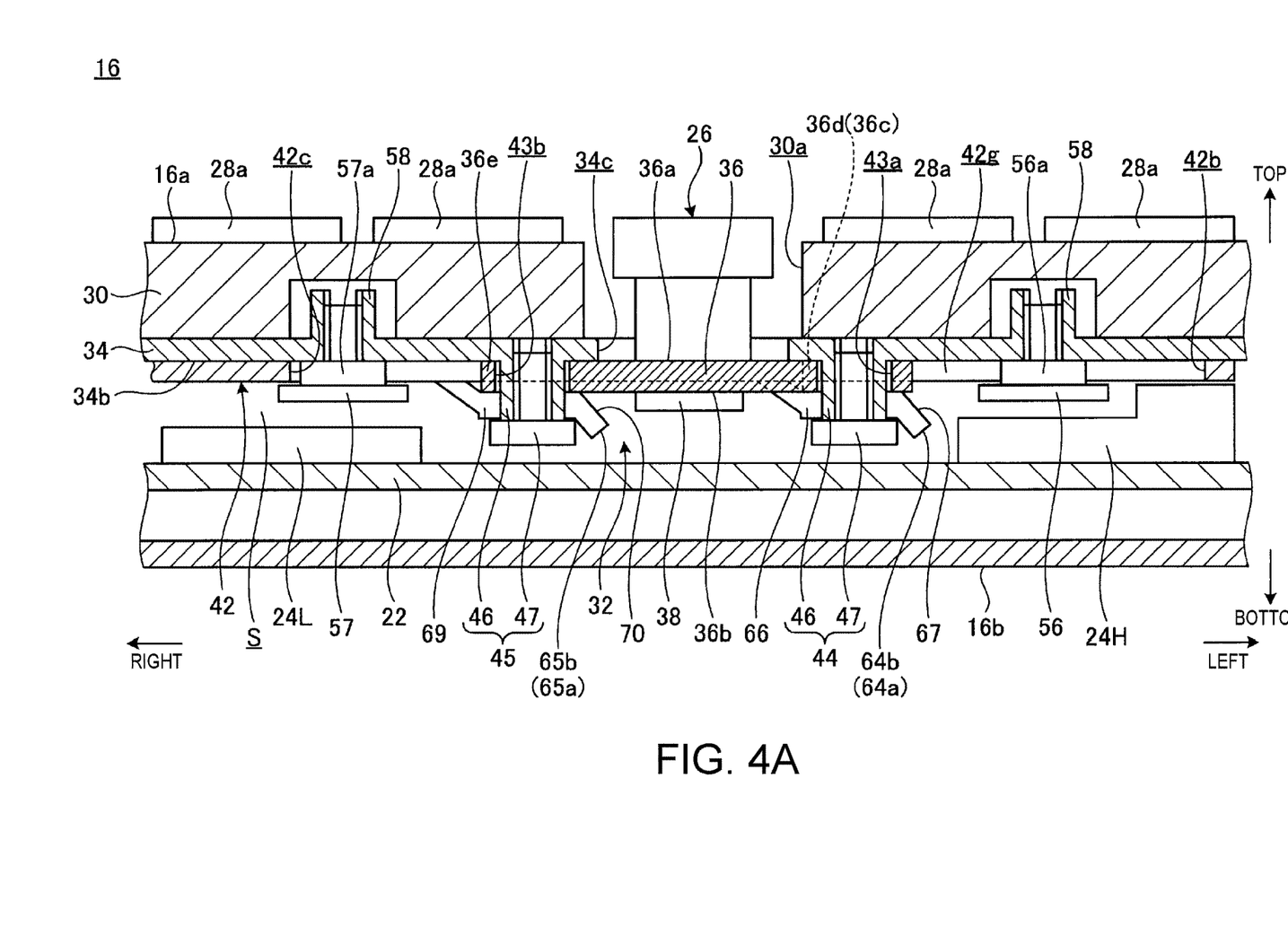
FIG. 4A is a cross-sectional side view showing the internal structure of a main body chassis in a state where a pointing stick is set in a use position by the stick position setting mechanism.
Figure 4B:
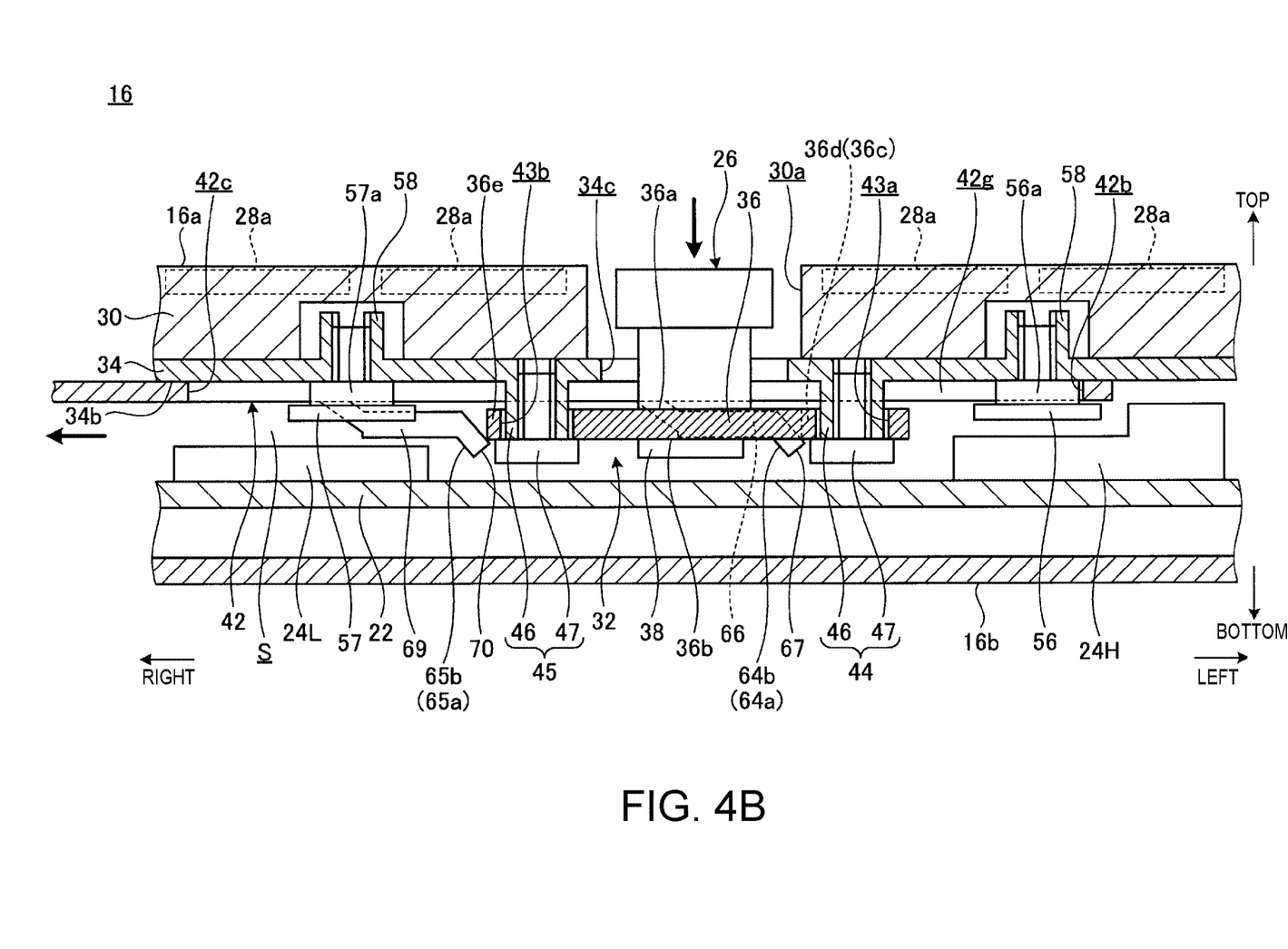
FIG. 4B is a cross-sectional side view showing the internal structure of the main body chassis in a state where the pointing stick is set in a storage position by the stick position setting mechanism.

The pointing stick 26 can be raised and lowered through a hole 30a formed substantially in the center of the frame 30 (see FIGS. 4A and 4B). The main body chassis 16 is provided with a stick position setting mechanism 32 for raising and lowering the pointing stick 26 (see FIGS. 4A and 4B). The stick position setting mechanism 32 is a mechanism that holds the pointing stick 26 in a use position used in a normal operation when the display chassis 14 is, for example, in a range from the 70-degree position to the 180-degree position, and holds the pointing stick 26 in a storage position pushed downward from the use position when the display chassis 14 is in the 0-degree position or the 360-degree position. The raising and lowering movement of the pointing stick 26 caused by the stick position setting mechanism 32 interlocks with a rotational movement of the display chassis 14.

Figure 3:
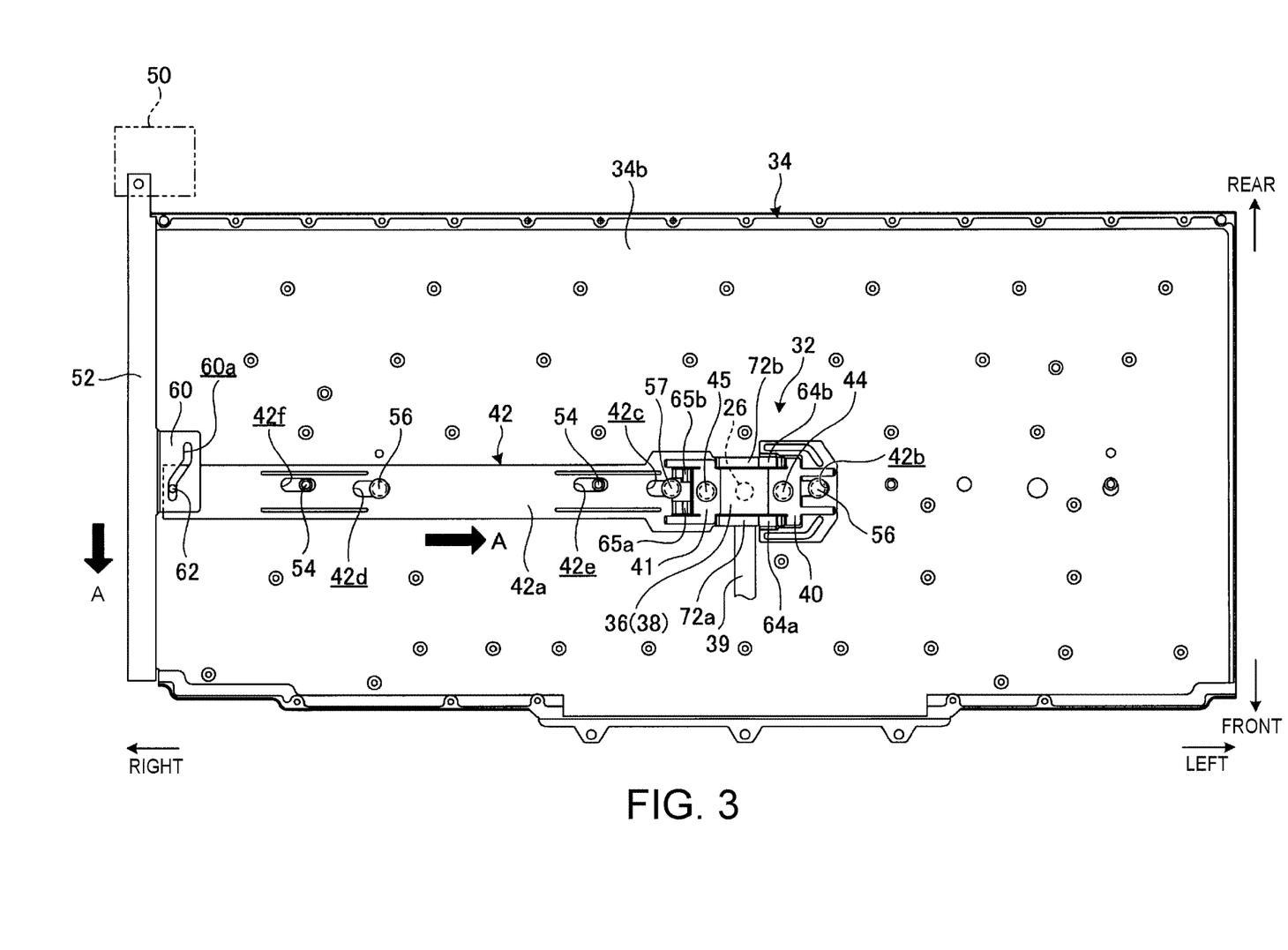
FIG. 3 is a bottom view showing a stick position setting mechanism.
Figure 5A:
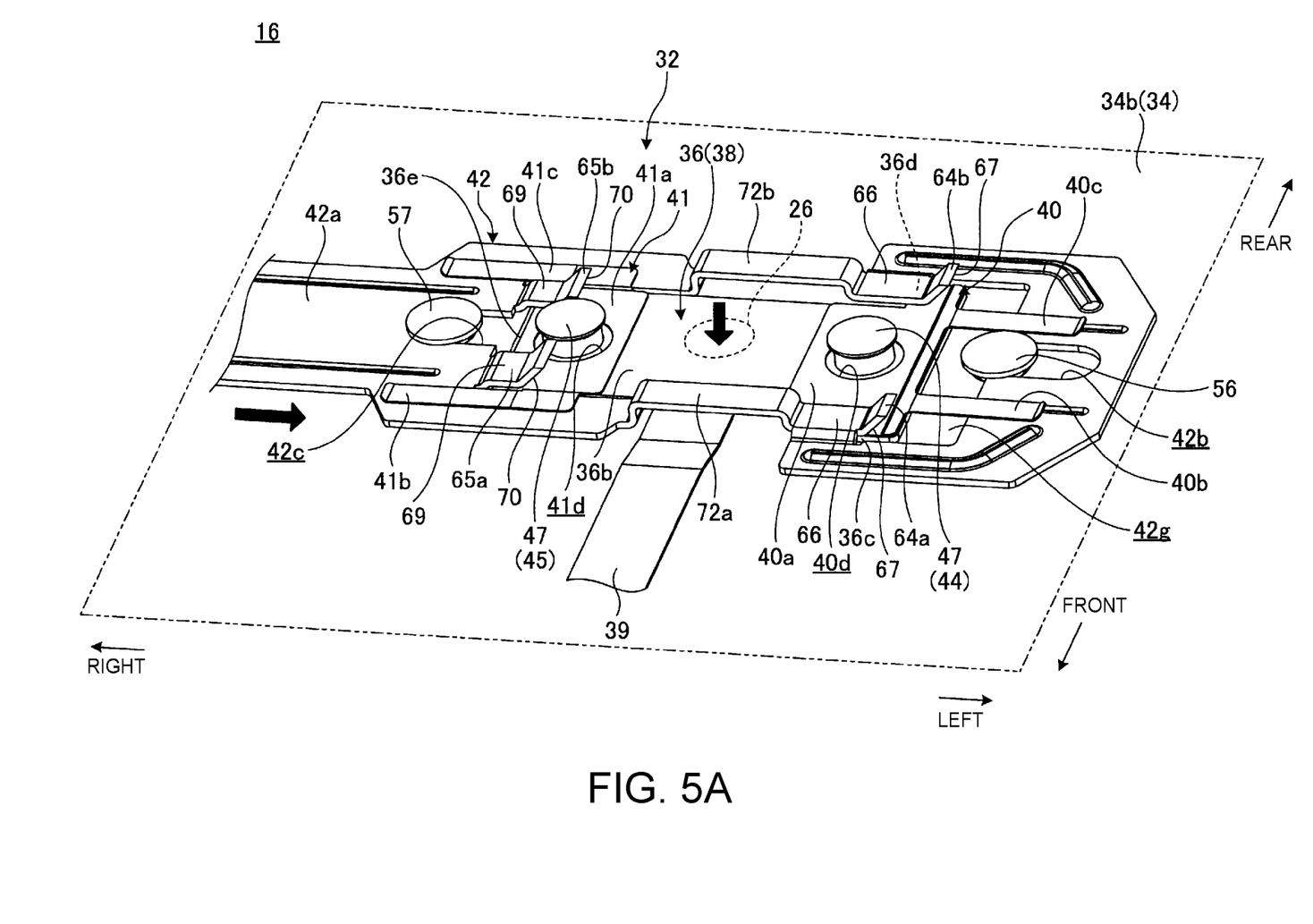
FIG. 5A is a perspective view of the pointing stick and its surrounding parts viewed from below in a state where the pointing stick is in the use position.
Figure 5B:
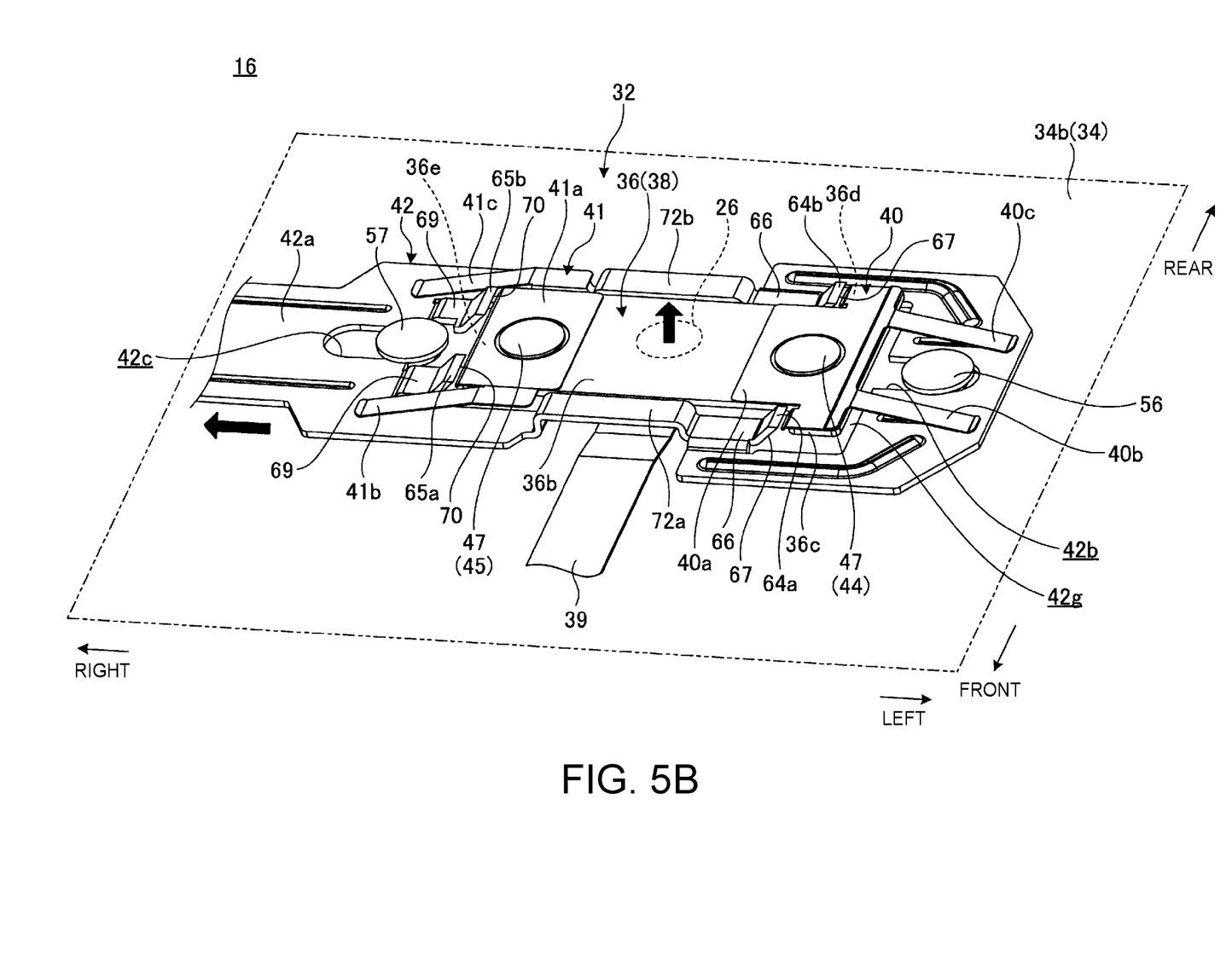
FIG. 5B is a perspective view of the pointing stick and its surrounding parts viewed from below in a state where the pointing stick is in the storage position.

FIG. 3 is a bottom view showing a configuration of the stick position setting mechanism 32, and illustrates the inside of the main body chassis 16 viewed from below the keyboard device 20. FIG. 4A is a cross-sectional side view schematically showing the internal structure of the main body chassis 16 in a state where the pointing stick 26 is set in the use position by the stick position setting mechanism 32. FIG. 4B is a cross-sectional side view schematically showing the internal structure of the main body chassis 16 in a state where the pointing stick 26 is set in the storage position by the stick position setting mechanism 32. FIG. 5A is a perspective view of the pointing stick 26 and its surrounding parts viewed from below in a state where the pointing stick 26 is in the use position. FIG. 5B is a perspective view of the pointing stick 26 and its surrounding parts viewed from below in a state where the pointing stick 26 is in the storage position.

As shown in FIGS. 3, 4A, and 4B, the stick position setting mechanism 32 is provided on the side of a bottom surface of the keyboard device 20 in the main body chassis 16. The keyboard device 20 is provided with the pointing stick 26, the frame 30, and the key switches 28 on the side of a top surface 34a of a base plate 34. The base plate 34 is formed by performing lancing or blanking on a thin metal plate such as an aluminum plate, and all the key switches 28 are attached to one base plate 34. A switch sheet such as a membrane sheet that detects a pressing operation on a keytop 28a lies between each keytop 28a and the base plate 34.

The pointing stick 26 is exposed to the top surface (a surface) 16a of the main body chassis 16 through the hole 30a of the frame 30. The pointing stick 26 is a columnar member made of, for example, a resin material or a hard rubber material. The pointing stick 26 is inserted from the hole 30a into a hole 34c formed on the base plate 34, and extends to the side of a bottom surface 34b of the base plate 34. That is, the pointing stick 26 goes through the keyboard device 20 in the top-bottom direction. The lower part of the pointing stick 26 is supported by a base member 36 stacked on the bottom surface 34b of the base plate 34. The pointing stick 26 projects upward from a top surface (one surface) 36a of the base member 36, and its lower end is connected to a sensor substrate 38 stacked on a bottom surface (the other surface) 36b of the base member 36.

The sensor substrate 38 is a control board of the pointing stick 26. The pointing stick 26 is a module integrally fixed to the sensor substrate 38 in a state where the pointing stick 26 is electrically connected to the sensor substrate 38. For example, a wire 39 connected to the circuit board 22 is connected to the sensor substrate 38. That is, the wire 39 is electrically connected to the pointing stick 26 through the sensor substrate 38. The wire 39 is pulled out from the sensor substrate 38 to the front.

Figure 6:
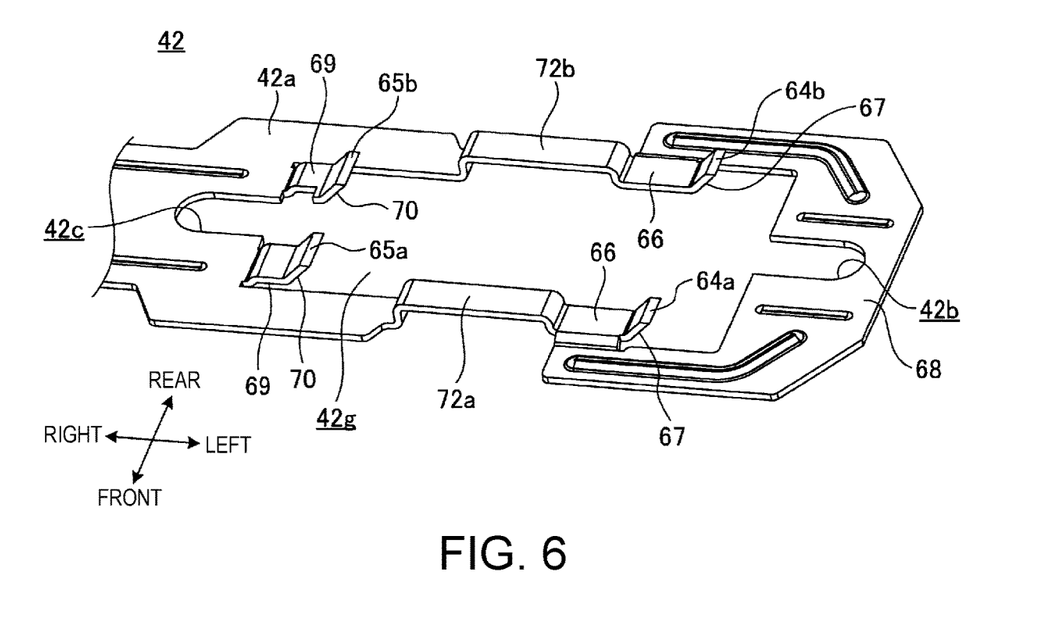
FIG. 6 is an enlarged perspective view showing a main section of a slide member.
Figure 7:
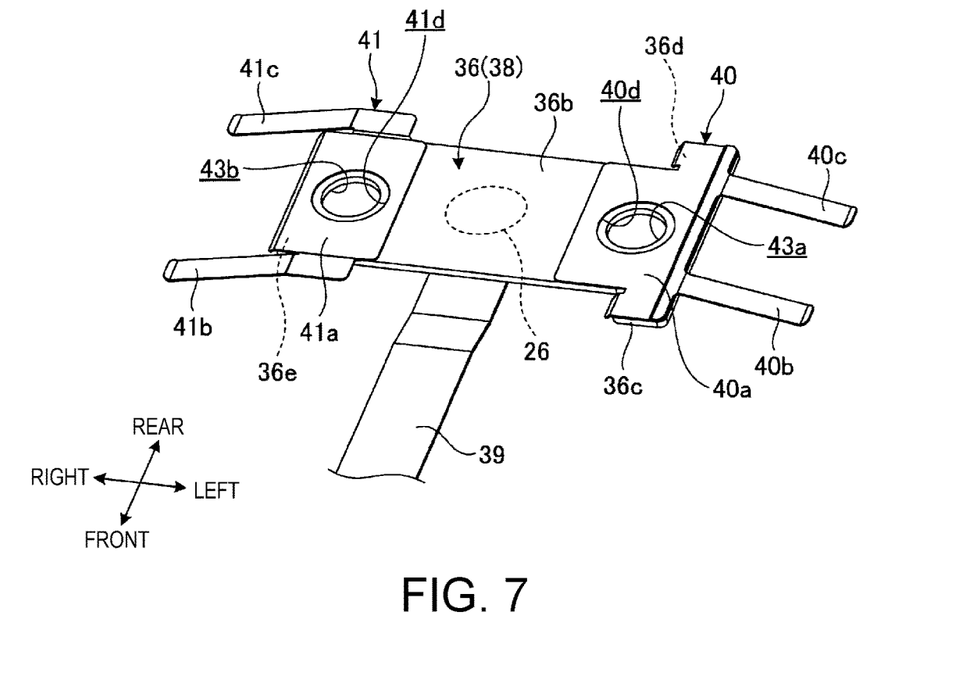
FIG. 7 is a perspective view showing a base member and an elastic member.

As shown in FIGS. 3 to 5B, the stick position setting mechanism 32 has the base member 36, a pair of elastic members 40 and 41, and a slide member 42. FIG. 6 is an enlarged perspective view showing a configuration of a main section of the slide member 42. FIG. 7 is a perspective view showing a configuration of the base member 36 and the elastic members 40 and 41.

As shown in FIGS. 4A to 5B, the base member 36 is a thin metal plate having substantially a T-shape in a plan view, and is provided so that the base member 36 can be raised and lowered inside the main body chassis 16. Guide holes 43a and 43b are formed on right and left ends of the base member 36, respectively (see FIG. 7). Raising/lowering guide members 44 and 45 are axially slidably inserted into the guide holes 43a and 43b, respectively. The pointing stick 26 and the sensor substrate 38 are attached to the base member 36 at a position between the right and left guide holes 43a and 43b. The base member 36 can move to a raised position of raising the pointing stick 26 from the top surface 16a and set it in the use position and a lowered position of lowering the pointing stick 26 from the top surface 16a and set it in the storage position under the guiding action of the raising/lowering guide members 44 and 45.

The base member 36 has a pair of front and rear first pressed parts 36c and 36d and a second pressed part 36e. The first pressed parts 36c and 36d are projecting pieces projecting to the front-rear direction from a distal end (the left end) of the base member 36 with respect to the slide member 42. The second pressed part 36e is formed of a proximal end (the right end) of the base member 36 with respect to the slide member 42.

As shown in FIGS. 4A and 4B, the raising/lowering guide members 44 and 45 each include a boss 46 projecting downward from the bottom surface 34b of the base plate 34 and a set screw 47 screwed onto the boss 46. The boss 46 is a cylindrical projection formed by knocking-out the base plate 34 to the side of the bottom surface 34b, and has a female screw formed so as to go through its axial center. The set screw 47 is screwed onto the boss 46 from the side of the bottom surface 34b of the base plate 34, and its head has a diameter larger than the boss 46 and the guide holes 43a and 43b. The respective set screws 47 of the raising/lowering guide members 44 and 45 are fastened with the bosses 46 slidably inserted into the guide holes 43a and 43b. Thus, the raising/lowering guide members 44 and 45 guide the base member 36 to make a raising and lowering movement. The head of the set screw 47 retains the base member 36, and defines the most lowered position of the base member 36.

The elastic members 40 and 41 are a leaf spring that constantly biases the base member 36 in a direction from the raised position toward the lowered position (downward). The left elastic member 40 has an attachment part 40a that covers the left part of the base member 36 including the first pressed parts 36c and 36d and a pair of front and rear elastic arms 40b and 40c projecting leftward from a left end of the attachment part 40a. The right elastic member 41 has an attachment part 41a that covers the right part of the base member 36 including the second pressed part 36e and a pair of front and rear elastic arms 41b and 41c projecting rightward from a right end of the attachment part 41a. The attachment parts 40a and 41a are firmly fixed to the bottom surface 36b of the base member 36, and have openings 40d and 41d into which the raising/lowering guide members 44 and 45 are inserted, respectively (see FIG. 5B). Respective proximal ends (one ends) of the elastic arms 40b, 40c, 41b, and 41c are fixed to the bottom surface 36b of the base member 36 through the attachment part 40a, and distal ends (the other ends) thereof are slidably in contact with a surface 42a of the slide member 42. In FIGS. 4A and 4B, illustrations of the elastic members 40 and 41 are omitted.

The elastic members 40 and 41 are arranged substantially bi-symmetrically across the pointing stick 26, and the base member 36 receives an equal biasing force from each of the left and right elastic members 40 and 41. Therefore, the base member 36 can be stably raised and lowered while maintaining a horizontal posture. In a case of the present embodiment, the attachment parts 40a and 41a of the elastic members 40 and 41 cover the pressed parts 36c, 36d, and 36e of the base member 36. Therefore, the elastic members 40 and 41 are configured to receive a pressing force from the slide member 42 together with these pressed parts 36c, 36d, and 36e. The attachment parts 40a and 41a may be configured not to cover the pressed parts 36c, 36d, and 36e of the base member 36; alternatively, for example, respective portions of the attachment parts 40a and 41a near the pressed parts 36c, 36d, and 36e may be cut out. The elastic members 40 and 41 may be, for example, coil springs or the like inserted into the raising/lowering guide members 44 and 45; however, as in the present embodiment, a leaf spring has the advantage of easily making the elastic members 40 and 41 thinner.

As shown in FIGS. 3, 4A, and 4B, the slide member 42 is a long rectangular plate-like member provided so as to be slidable in the right-left direction on the side of the bottom surface 34b of the base plate 34. The slide member 42 slides in the right-left direction in conjunction with a front-rear directional movement of a slide link member 52 included in a link mechanism 50 (see FIG. 3). A proximal end (a right end) of the slide member 42 is connected to the slide link member 52, and a distal end (a left end) thereof extends to a position that overlaps with the base member 36 of the pointing stick 26.

The slide member 42 has three guide long holes 42b, 42c, and 42d formed substantially in the center in the width direction (the front-rear direction) and two auxiliary guide long holes 42e and 42f formed by offsetting slightly to the rear from the guide long holes 42b, 42c, and 42d. Guide pins 54 projecting downward from the bottom surface 34b of the base plate 34 are slidably inserted into the auxiliary guide long holes 42e and 42f. Between the two guide long holes 42b and 42c located on the distal end side, the pointing stick 26, the base member 36, and the raising/lowering guide members 44 and 45 are installed. The slide member 42 has an opening 42g on its distal end side. Respective facing ends of the guide long holes 42b and 42c communicate with the opening 42g (see FIG. 6). Slide guide members 56 and 57 are slidably inserted into the guide long holes 42b and 42c, respectively (see FIGS. 4A to 5B).

As shown in FIGS. 4A and 4B, the slide guide members 56 and 57 are composed of a step screw, and are each screwed into a boss 58 projecting downward from the top surface 34a of the base plate 34. The boss 58 is a cylindrical projection formed by knocking-out the base plate 34 to the side of the top surface 34a, and has a female screw formed so as to go through its axial center. Respective screw portions of the slide guide members 56 and 57 are screwed into the bosses 58, and respective step portions 56a and 57a are in contact with the bottom surface 34b of the base plate 34 in the respective guide long holes 42b and 42c. Thus, the slide guide members 56 and 57 guide the slide member 42 to make a sliding movement. Respective heads of the slide guide members 56 and 57 retain the slide member 42 (see FIGS. 5A and 5B). It is noted that a slide guide member 56 (or 57) having the same structure as the slide guide member 56 is slidably inserted into the guide long hole 42d (see FIG. 3).

As shown in FIG. 3, a link plate 60 projecting toward the keyboard device 20 is provided on a side of the slide link member 52. The link plate 60 is provided with an oblique crank-shaped drive hole 60a gradually displaced from the left to the right that extends from the front to the rear. The right end of the slide member 42 is provided so as to overlap with a top surface of the link plate 60. A drive pin 62 slidably engaged with the drive hole 60a is jutted out from the right end of the slide member 42. Therefore, when the slide link member 52 moves in the front-rear direction, the drive pin 62 slides in the drive hole 60a that moves in the front-rear direction. As a result, the slide member 42 slides in the right-left direction under the guiding action of the slide guide members 56 and 57.

The distal end of the slide member 42 is provided with first pressing parts 64a and 64b and second pressing parts 65a and 65b for raising and lowering the pointing stick 26.

As shown in FIGS. 5A to 6, the first pressing parts 64a and 64b each include a holding portion 66 extending toward the distal end of the slide member 42 and an upthrust portion 67 that is bent from a distal end of the holding portion 66 and is inclined downward. The holding portion 66 is a horizontal plate that is formed in a position one level lower than the surface 42a of the slide member 42 and is along the right-left direction. The upthrust portion 67 is an incline plate that is gradually inclined downward from the holding portion 66 to the distal end, and faces on the opening 42g. The slide member 42 has a substantially U-shaped distal end reinforcing part 68 that connects respective sides of the holding portions 66 of the first pressing parts 64a and 64b and is formed to surround the first pressing parts 64a and 64b. The distal end reinforcing part 68 is a part connecting between the pair of front and rear pressing parts 64a and 64b to reinforce them. The guide long hole 42b is formed on the distal end reinforcing part 68. The distal end reinforcing part 68 may be omitted; however, the presence of the distal end reinforcing part 68 enables the base member 36 to be more stably pressed by the first pressing parts 64a and 64b.

The second pressing parts 65a and 65b each include a holding portion 69 extending toward the distal end of the slide member 42 and an upthrust portion 70 that is bent from a distal end of the holding portion 69 and is inclined downward. The holding portion 69 is a horizontal plate that is formed in a position one level lower than the surface 42a of the slide member 42 and is along the right-left direction. The upthrust portion 70 is an incline plate that is gradually inclined downward from the holding portion 69 to the distal end, and faces on the opening 42g.

The slide member 42 has a bridge part 72a provided between the front-side pressing parts 64a and 65a and a bridge part 72b provided between the rear-side pressing parts 64b and 65b. The bridge parts 72a and 72b are narrow plates extending in the right-left direction on the front and rear of the opening 42g. The bridge parts 72a and 72b have a concave shape downwardly bulging out from the surface 42a of the slide member 42, and straddles the wire 39. The bridge parts 72a and 72b are each set to a height and right-left directional length that prevents them from interfering with the wire 39 in case the slide member 42 slides (see FIGS. 5A and 5B).

In a state where the pointing stick 26 is in the storage position shown in FIGS. 4B and 5B, the stick position setting mechanism 32 sets the slide link member 52 in a position moved to the rear most, and sets the slide member 42 in a position moved farthest in a direction away from the base member 36 (to the right) (see FIG. 3). In this state, the upthrust portions 67 of the first pressing parts 64a and 64b of the slide member 42 are in positions drawn back from the first pressed parts 36c and 36d of the base member 36, and at the same time, the upthrust portions 70 of the second pressing parts 65a and 65b are in positions drawn back from the second pressed part 36e (see FIGS. 4B and 5B). Accordingly, the base member 36 is in the lowered position lowered by biasing forces of the elastic members 40 and 41, and the pointing stick 26 is held in the storage position. When the pointing stick 26 is in the storage position, the top of the pointing stick 26 is located substantially on the same level as or lower than a top surface of the frame 30, and a top surface of the keyboard device 20 becomes an even flat surface. At this time, in the electronic apparatus 10, the keytops 28a are also lowered to the storage position by the above-described key position setting mechanism.

In a state where the pointing stick 26 is in the storage position shown in FIGS. 4B and 5B, if the slide link member 52 has been moved to the front through the link mechanism 50, the slide member 42 is moved to one direction (the left) of coming closer to the base member 36 (see arrows A placed beside the slide link member 52 and the slide member 42 in FIG. 3). Accordingly, the upthrust portions 67 of the first pressing parts 64a and 64b of the slide member 42 come in sliding contact with and thrust up the first pressed parts 36c and 36d of the base member 36, and at the same time, the upthrust portions 70 of the second pressing parts 65a and 65b also come in sliding contact with and thrust up the second pressed part 36e. Thus, the base member 36 is gradually raised against the biasing forces of the elastic members 40 and 41. Eventually, as shown in FIGS. 4A and 5A, the holding portions 66 of the first pressing parts 64a and 64b of the slide member 42 come in contact with the first pressed parts 36c and 36d of the base member 36, and at the same time, the holding portions 69 of the second pressing parts 65a and 65b come in contact with the second pressed part 36e. Therefore, the base member 36 is held in the raised position under the holding action of the holding portions 66 and 69, and the pointing stick 26 is held in the use position. When the pointing stick 26 is in the use position, the top of the pointing stick 26 is located higher than or substantially on the same level as the top surface of the frame 30, and a user can operate the pointing stick 26. At this time, in the electronic apparatus 10, the keytops 28a are also raised to the use position by the above-described key position setting mechanism.

In a state where the pointing stick 26 is in the use position shown in FIGS. 4A and 5A, if the slide link member 52 has been moved to the rear through the link mechanism 50, the slide member 42 is moved to the other direction (the right) of getting away from the base member 36, and the pressing parts 64a, 64b, 65a, and 65b of the slide member 42 are drawn back from the pressed parts 36c to 36e, and the base member 36 is released from the pressing force. As a result, the base member 36 is moved to the lowered position by the biasing forces of the elastic members 40 and 41, and the pointing stick 26 is in the storage position again.

The raising and lowering movement of the pointing stick 26 caused by the stick position setting mechanism 32 is connected with the hinge mechanism 12 through the link mechanism 50 and corresponds to the rotational movement angular position of the display chassis 14.

Figure 8:
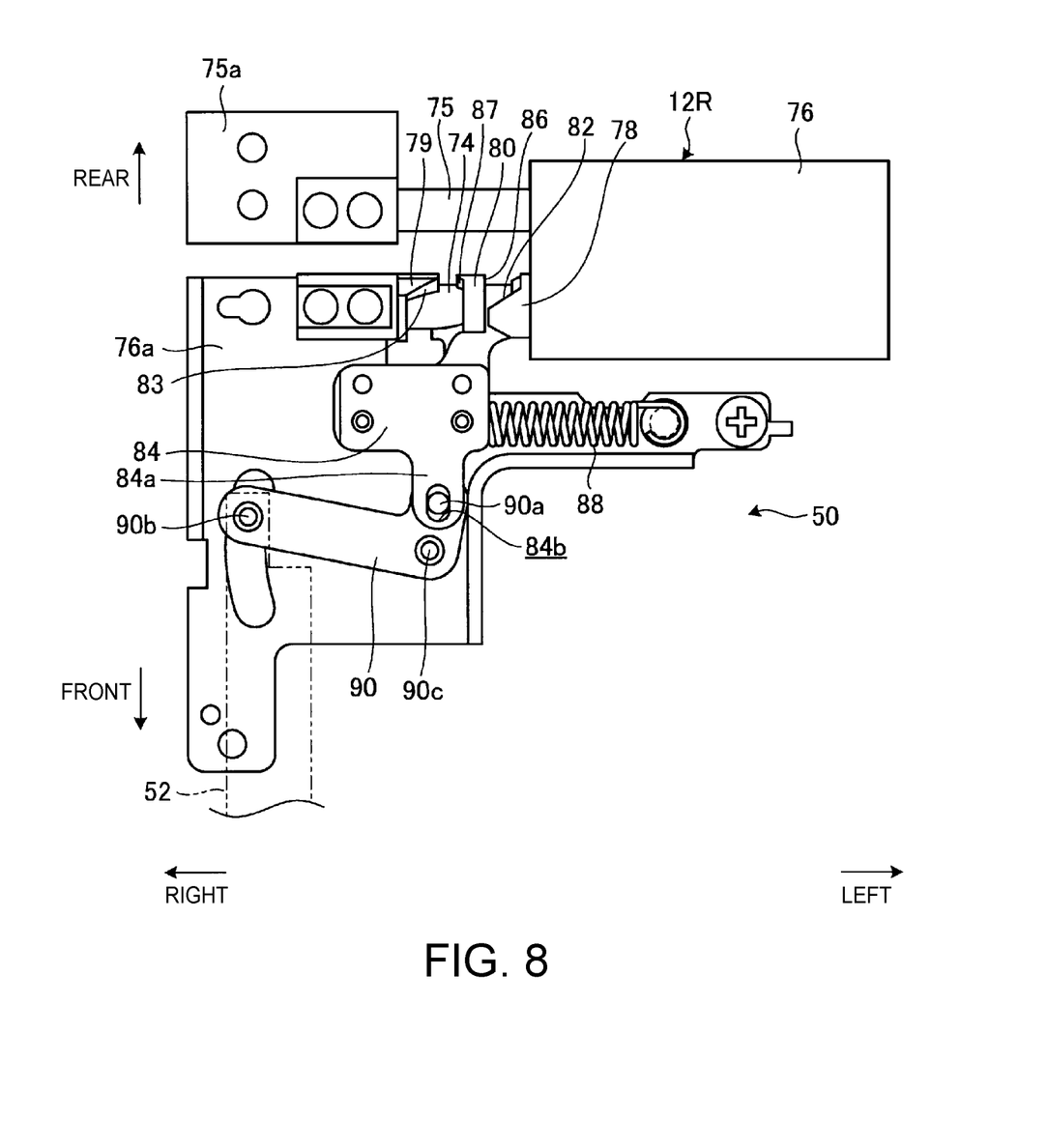
FIG. 8 is a plan view showing an example of a hinge mechanism and a link mechanism.

Subsequently, a configuration example of the hinge mechanism 12 and the link mechanism 50 that allow a rotational movement of the display chassis 14 to interlock with an operation of the stick position setting mechanism 32. FIG. 8 is a plan view schematically showing the configuration example of the hinge mechanism 12 and the link mechanism 50. In the present embodiment, the slide link member 52 and the slide member 42 are provided on the right of the keyboard device 20 as shown in FIG. 3; therefore, the link mechanism 50 is configured to interlock with the right hinge mechanism 12R. Needless to say, in a case where the slide link member 52 and the slide member 42 are provided on the left of the keyboard device 20, the link mechanism 50 may be configured to interlock with the left hinge mechanism 12L.

As shown in FIG. 8, the hinge mechanism 12R includes a first shaft 74 extending in the right-left direction, a second shaft 75 provided parallel to the first shaft 74, and a box-like hinge chassis 76 that rotatably supports and stores therein the first shaft 74 and the second shaft 75 (see FIGS. 2A and 2B as well). An attachment plate 74a fixed to one end of the first shaft 74 is fixed to the main body chassis 16, thereby the first shaft 74 rotates along with the main body chassis 16. An attachment plate 75a fixed to one end of the second shaft 75 is fixed to the display chassis 14, thereby the second shaft 75 rotates along with the display chassis 14. The other ends of the first and second shafts 74 and 75 are rotatably supported inside the hinge chassis 76. In a case of the present embodiment, the first shaft 74 and the second shaft 75 rotate in synchronization through a gear train (not shown) housed in the hinge chassis 76.

A first cam member 78 and a second cam member 79 are fitted onto an outer circumference surface of a portion of the first shaft 74 that becomes the outside of the hinge chassis 76, and a movable tubular body 80 is inserted between the cam members 78 and 79. The cam members 78 and 79 are provided to keep a space for the movement of the movable tubular body 80 between them, and are each non-rotatably fitted onto the outer circumference surface of the first shaft 74. The movable tubular body 80 is rotatably and axially movably inserted into the outer circumference surface of the first shaft 74. The first cam member 78 has a first cam surface 82 whose axial position changes along a circumferential direction on its end surface on the side of the movable tubular body 80. The second cam member 79 has a second cam surface 83 whose axial position changes along the circumferential direction on its end surface on the side of the movable tubular body 80.

The movable tubular body 80 is fixed to a slide link 84 movably supported on a surface of the attachment plate 74a so that the slide link 84 can move in the right-left direction. The movable tubular body 80 has first and second pressed surfaces 86 and 87 whose axial positions change along the circumferential direction on its right and left end surfaces. One end of a coil spring 88 is fastened to a right surface of the slide link 84. The other end of the coil spring 88 is fastened to a pin jutted out from the surface of the attachment plate 74a. The coil spring 88 is constantly biases the slide link 84 toward a direction of moving the movable tubular body 80 to the side of the first cam member 78.

The slide link 84 has a connecting plate 84a projecting forward. The connecting plate 84a is provided with a hole 84b, and a connecting drive pin 90a projecting from an oscillation link 90 is rotatably inserted into the hole 84b. The oscillation link 90 is a plate having substantially an L-shape in a plan view. An end of a portion of the oscillation link 90 that is a short side of the L shape is rotatably connected to the slide link 84 through the use of the connecting drive pin 90a, and an end of a portion that is a long side of the L shape is rotatably connected to the rear end of the slide link member 52 through the use of a link drive pin 90b. A portion of the oscillation link 90 that is a corner of the L shape is rotatably supported by the attachment plate 74a through the use of a rotating shaft 90c.

In the hinge mechanism 12R and the link mechanism 50, the spiral shapes of the cam surfaces 82 and 83 and the pressed surfaces 86 and 87 are set fittingly. Then, in the link mechanism 50, the slide link 84 slides in the right-left direction according to the rotation angle of the first shaft 74, i.e., the rotational movement angle of the display chassis 14 with respect to the main body chassis 16, and the oscillation link 90 oscillates in the front-rear direction. As a result, the link mechanism 50 can slide the slide link member 52 in the front-rear direction at intended timing according to the rotational movement angle of the display chassis 14. For example, in the electronic apparatus 10, the pointing stick 26 is in the use position when the display chassis 14 is in a range from the 70-degree position to the 180-degree position, and the pointing stick 26 is in the storage position when the display chassis 14 is in the 0-degree position or the 360-degree position. Accordingly, when the display chassis 14 is in a range from the 70-degree position to the 180-degree position, the link mechanism 50 sets the slide link member 52 in a position moved to the front most, thereby the pointing stick 26 can be set in the use position through the slide member 42. Furthermore, when the display chassis 14 is in the 0-degree position or the 360-degree position, the link mechanism 50 sets the slide link member 52 in a position moved to the rear most, thereby the pointing stick 26 can be set in the storage position through the slide member 42.

As described above, in the electronic apparatus 10 according to the present embodiment, the base member 36 supports the pointing stick 26 on the top surface 36a, and has the first pressed parts 36c and 36d provided on one side (the left side) of the pointing stick 26 with respect to the sliding direction of the slide member 42 and the second pressed part 36e provided on the other side (the right side) of the pointing stick 26. Furthermore, the slide member 42 has the first pressing parts 64a and 64b capable of pressing the first pressed parts 36c and 36d of the base member 36 and the second pressing parts 65a and 65b capable of pressing the second pressed part 36e.

In this way, in the electronic apparatus 10, the pointing stick 26 is raised and lowered by one slide member 42. Thus, it is possible to secure a lot of space S between the keyboard device 20 (the base plate 34) and the circuit board 22 (see FIGS. 4A and 4B). Furthermore, the first pressed parts 36c and 36d and the second pressed part 36e of the base member 36 that are pressed by the first pressing parts 64a and 64b and the second pressing parts 65a and 65b of the slide member 42 are provided on one side (the left side) and the other side (the right side) of the pointing stick 26 with respect to the sliding direction (the right-left direction) of the slide member 42. Therefore, the base member 36 that raises and lowers the pointing stick 26 can adopt a configurational posture with its longer side along the sliding direction of the slide member 42. As a result, the extent of the space S occupied by the base member 36 substantially overlaps with the extent occupied by the slide member 42. That is, due to the configuration to raise and lower the pointing stick 26, reduction in the extent of the space S along the sliding direction of the slide member 42 is unavoidable; however, in a case of the present embodiment, the raising and lowering movement of the base member 36 can be secured with the amount of reduction rarely different from the amount of reduction in the space S. Therefore, the electronic apparatus 10 can considerably diminish the restriction on the packaging design of the electronic components 24L and 24H on the circuit board 22. In the electronic apparatus 10, particularly, enough space S is secured also in the position close to the front and rear of the pointing stick 26; therefore, it is possible to arrange the electronic components 24L and 24H in this part, thus there is a lot of flexibility in the packaging design.

In the electronic apparatus 10, the wire 39 connected to the pointing stick 26 passes through a position between the first pressed parts 36c and 36d and the second pressed part 36e of the base member 36. Then, the slide member 42 has the bridge parts 72a and 72b straddling the wire 39 in positions between the first pressing parts 64a and 64b and the second pressing parts 65a and 65b. This can avoid interference of the slide member 42 with the wire 39 when the slide member 42 makes a sliding movement. In the electronic apparatus 10, particularly, the slide member 42 is configured to press the right and left sides of the base member 36; therefore, it is desirable that the wire 39 be pulled out to the front or the rear of the base member 36. Thus, the slide member 42 has the bridge parts 72a and 72b, thereby the wire 39 does not hinder a sliding movement of the slide member 42. It is to be noted that in a case of the present embodiment, wire 39 is pulled out only to the front of the base member 36, thus the rear bridge part 72b may be omitted.

In the electronic apparatus 10, the pair of elastic members 40 and 41 are provided on one side (the left) and the other side (the right) of the pointing stick 26 in the sliding direction of the slide member 42. Then, the proximal ends of the elastic members 40 and 41 are fixed to the base member 36, and the distal ends thereof are slidably in contact with the surface 42a of the slide member 42. Therefore, the elastic members 40 and 41 can bias the base member 36 while certainly maintaining the horizontal posture of the base member 36. Furthermore, the elastic members 40 and 41 are provided within a sliding range of the slide member 42 in a plan view. Therefore, a lot more space S can be secured without the elastic members 40 and 41 occupying the space S. The elastic members 40 and 41 may have an integral structure in which their proximal ends are connected, or one of the elastic members 40 and 41 may be eliminated. Furthermore, the pair of elastic members 40 and 41 may be configured so that their proximal ends are fixed to the slide member 42, and their distal ends are slidably in contact with the bottom surface 36b of the base member 36.

In the electronic apparatus 10, the raising/lowering guide members 44 and 45 that guide the base member 36 to make a raising and lowering movement need to project from the bottom surface 34b of the base plate 34 to some extent (see FIGS. 4A and 4B). Meanwhile, the slide guide members 56 and 57 that guide the slide member 42 to make a sliding movement are composed of a step screw screwed into the boss 58 projecting from the top surface 34a of the base plate 34. Therefore, it is possible to minimize the amount of projection of the slide guide members 56 and 57 into the space S. As a result, as shown in FIGS. 4A and 4B, even in a space S that overlaps with the slide member 42, the electronic component 24L can be mounted below the slide guide member 57. Meanwhile, in a space S that does not overlap with the slide member 42, even if it is a position that overlaps with the slide guide member 56, the electronic component 24H having a height greater than the electronic component 24L can be mounted, and the restriction on the packaging design can be further diminished.

Figure 9:
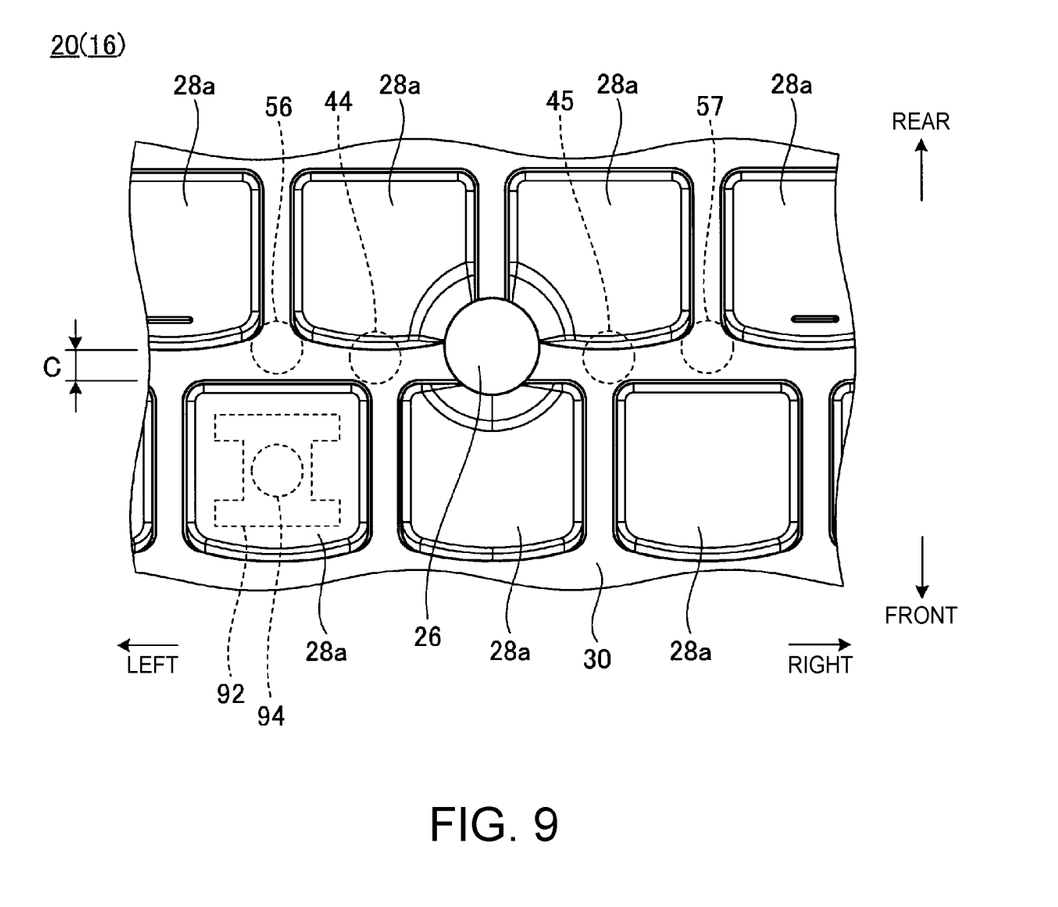
FIG. 9 is an enlarged plan view of the pointing stick and its surrounding parts provided on a keyboard device.

Incidentally, as shown in FIG. 9, the raising/lowering guide members 44 and 45 that guide the base member 36 to make a raising and lowering movement and the slide guide members 56 and 57 that guide the slide member 42 to make a sliding movement lie alongside in the right-left direction across the pointing stick 26. Here, the raising/lowering guide members 44 and 45 and the slide guide members 56 and 57 are arranged to overlap with a gap C formed between multiple keytops 28a arranged in the right-left direction and multiple keytops 28a arranged in the right-left direction in front of (or behind) them. That is, the slide member 42 also slides in the right-left direction in a position that overlaps with the gap C. This prevents the raising/lowering guide members 44 and 45 and the slide guide members 56 and 57 that project in the top-bottom direction of the keyboard device 20 from interfering with a pantograph mechanism 92 and a rubber dome 94 that move the keytops 28a up and down. In a case of the present embodiment, particularly, the slide guide members 56 and 57 largely project upward from the base plate 34, and a gap between the slide guide members 56 and 57 and the circuit board 22 located below is maximally secured; therefore, there is a profound effect of preventing interference with the pantograph mechanism 92 and the rubber dome 94 due to an overlap with the gap C.

Figure 10:
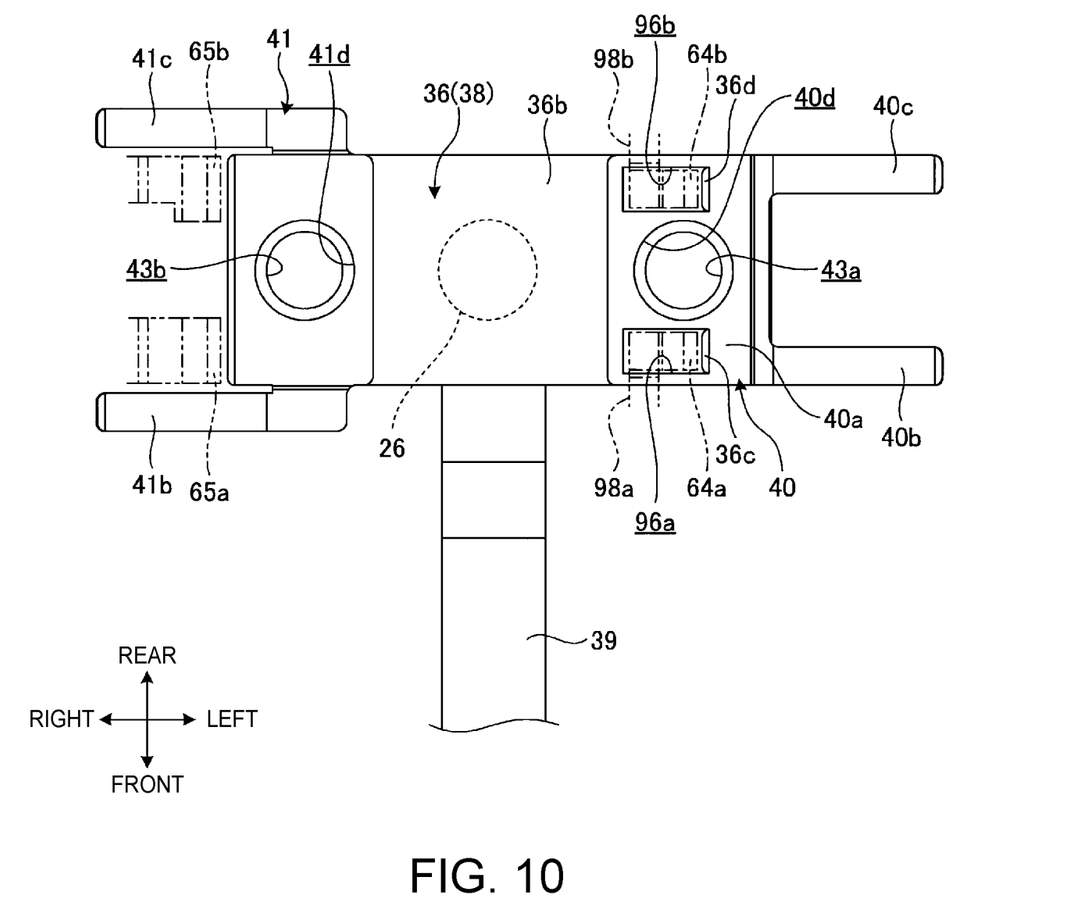
FIG. 10 is a plan view showing a base member according to a modification example.

Incidentally, besides a configuration in which the first pressed parts 36c and 36d provided in the base member 36 project in the front-rear direction as shown in FIG. 7, the first pressed parts 36c and 36d may be configured, for example, as shown in FIG. 10, where the base member 36 and the elastic member 40 are provided with a pair of front and rear openings 96a and 96b, and an inner wall surface facing to the right of these openings 96a and 96b is formed. Then, a width dimension of the base member 36 in the front-rear direction can be decreased further, and the influence on the electronic components 24L and 24H can be reduced further. It is to be noted that in a case where the base member 36 is configured as shown in FIG. 10, for example, the first pressing parts 64a and 64b may be provided in the openings 96a and 96b through arms 98a and 98b that straddle the side of the bottom surface 36b of the base member 36 from the ends of the bridge parts 72a and 72b.

It is to be noted that needless to say, the present invention is not limited to the contents disclosed above, and can be freely modified without departing from the scope of the invention.

In the above-described configuration, as an example, the base member 36 is provided with the pair of front and rear first pressed parts 36c and 36d, and the slide member 42 is provided with the pair of front and rear first pressing parts 64a and 64b; alternatively, the base member 36 may be provided with only either one of the first pressed parts 36c and 36d, and the slide member 42 may be provided with only either one of the first pressing parts 64a and 64b. Likewise, in the above-described configuration, as an example, the second pressed part 36e of the base member 36 has a shape that extends in the front-rear direction, and the slide member 42 is provided with the pair of front and rear second pressing parts 65a and 65b; alternatively, the second pressed part 36e may have a narrow width in the front-rear direction, and the slide member 42 may be provided with only either one of the second pressing parts 65a and 65b. However, the first pressed parts 36c and 36d, the first pressing parts 64a and 64b, and the second pressing parts 65a and 65b should be a pair of front and rear parts to maintain a horizontal posture of the base member 36 and make the raising and lowering movement of the base member 36 more stable. Needless to say, the base member 36 may be provided with a pair of front and rear second pressed parts 36e.

In the above, there is described an example where the pointing stick 26 is used as an operating member that is raised and lowered in conjunction with a rotational movement angle of the display chassis 14; however, this operating member may be another component. For example, together with or instead of the pointing stick 26, a push button or the like that can be raised and lowered may be provided on the top surface 16a of the main body chassis 16.

In the above, there is described an example where the stick position setting mechanism 32 transmits the rotation of the hinge mechanism 12 from the slide link member 52 to the slide member 42 through the link mechanism 50. Instead of this mechanical link mechanism 50, for example, an actuator such as an electric motor driven according to an angle of rotational movement of the display chassis 14 caused by the hinge mechanism 12 may be used to slide the slide member 42 through the slide link member 52 or without the slide link member 52. Furthermore, the sliding direction of the slide member 42 may be the front-rear direction; in this case, also in the base member 36, the first pressed parts 36c and 36d, the second pressed part 36e, etc. only have to be arranged along the front-rear direction.

As has been described, the present invention provides an electronic device capable of securing a lot of space in a top-bottom direction inside a chassis even if the electronic device includes a mechanism of raising and lowering an operating member.

While the invention has been particularly shown and described with reference to a preferred embodiment, it will be understood by those skilled in the art that various changes in form and detail may be made therein without departing from the spirit and scope of the invention.

What is claimed is:

1. An electronic apparatus comprising:
a chassis;
an operating member exposed to a surface of said chassis;
a base member, located inside said chassis, moves between a raised position of raising said operating member supported on one surface thereof from said surface of said chassis and a lowered position of lowering said operating member from said surface of said chassis;
an elastic member biases said base member in a direction from said raised position towards said lowered position, wherein said elastic member includes at least a pair of elastic members provided on one side and on another side of said operating member; and
a slide member slidable inside said chassis and, when having slid in one direction, presses said base member against a biasing force of said elastic member to set said base member in said raised position, while, when having slid in another direction opposite to said one direction, which releases said operating member from a pressing force, and thereby sets said base member in said lowered position using said biasing force of said elastic member.

2. The electronic apparatus of claim 1, wherein said base member includes a first pressed part provided on said one side of said operating member with respect to a sliding direction of said slide member and a second pressed part provided on said another side of said operating member that is opposite to said one side.

3. The electronic apparatus of claim 2, wherein said slide member includes a first pressing part for pressing said first pressed part of said base member and a second pressing part for pressing said second pressed part.

4. The electronic apparatus of claim 3, wherein a wire is connected to said operating member, and passes through a position between said first pressed part and said second pressed part of said base member.

5. The electronic apparatus of claim 4, wherein said slide member includes a bridge part straddling said wire in a position between said first pressing part and said second pressing part.

6. The electronic apparatus of claim 1, wherein respective one ends of said pair of elastic members are fixed to said base member and another ends are slidably in contact with a surface of said slide member, or the one ends are slidably in contact with another surface of said base member opposite to said one surface and the other ends are fixed to said slide member.

7. The electronic apparatus of claim 1, further comprising a keyboard device having a plurality of keytops with up-and-down movements provided on said surface of said chassis.

8. The electronic apparatus of claim 7, wherein said operating member is a pointing stick provided on said keyboard device.

9. The electronic apparatus of claim 7, wherein said keyboard device includes three lines of multiple keytops arranged in a right-left direction through a gap extending in the right-left direction between adjacent lines, and said slide member slides in said right-left direction at a position that overlaps with said gap of said keyboard device.

10. The electronic apparatus of claim 7, further comprising:
raising/lowering guide members that are provided at least on said one side and said other side of said base member, and guide said base member to make a raising and lowering movement between said raised position and said lowered position; and
a slide guide member that guides said slide member to make a sliding movement in said right-left direction, wherein said raising/lowering guide members and said slide guide member are provided in a position that overlaps with said gap.

11. The electronic apparatus of claim 1, further comprising:
a display chassis that is rotationally movably connected to said chassis by a hinge mechanism and is provided with a display; and
a link mechanism that moves said slide member when said display chassis is rotationally moved with respect to said chassis.

* * * * *